Nov. 29, 1955

W. C. DUNLAP, JR 2,725,504

HALL EFFECT DEVICE

Filed Nov. 29, 1951

Inventor:
William C. Dunlap, Jr.
by Paul A Frank
His Attorney.

United States Patent Office 2,725,504

Patented Nov. 29, 1955

2,725,504

HALL EFFECT DEVICE

William C. Dunlap, Jr., Schenectady, N. Y., assignor to General Electric Company, a corporation of New York Application November 29, 1951, Serial No. 258,827

9 Claims. (Cl. 317—235)

Figure 1:
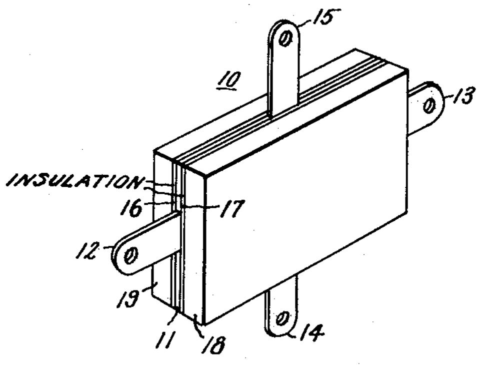

My invention relates to apparatus, such as measuring instruments and computing devices, which utilize a potential difference generated along one axis of a certain type of metallic plate when the plate is subjected to an orthogonal axis current under the influence of a magnetic field perpendicular to the plane of the plate. This potential difference-producing phenomenon has become known as the "Hall effect."

Certain metallic plates, such as thin wafers of properly prepared germanium, known as "Hall plates" exhibit this Hall effect to a marked degree; in other words, have a high "Hall co-efficient." In most electric devices employing such Hall plates, a magnetic field perpendicular to the plane of the plate is produced by placing the respective poles of a magnet on opposite sides of the plate in spaced relation thereto. The Hall plate is supported within this air gap between the opposing magnetic poles by suitable auxiliary supporting means.

Where it is desired to deliver the output Hall effect voltage to a device or circuit having high input impedance, such as the input circuit of an electric discharge device, it is preferable that the Hall plate have similar high impedance. In order to provide a small Hall plate having high impedance, such as in the neighborhood of 10,000 ohms, it is desirable that the plate have a thickness less than .010", which is much smaller than that usually employed. Conventional germanium Hall plates, for example, have a thickness greater than 0.050" with the result that a conventional Hall plate 2 centimeters long, one centimeter wide and comprising germanium having a resistivity of 20 ohm centimeters has an impedance lower than 1,000 ohms. The utility of Hall effect devices has therefore usually been restricted to applications in which the conventional thicker Hall plate delivers voltage to a low or moderate impedance circuit; the efficiency of the device being quite low when employed to drive high impedance circuits.

Very thin Hall plates having a thickness less than 0.010" not only have the advantage of high output impedance but also produce higher output Hall voltages than can be produced with the conventional thicker Hall plates. This is true since the output Hall voltage is inversely proportional to the thickness of the Hall plate, as is readily apparent from the following formula for output Hall voltage:

$$V=\frac{RIH}{t}$$

Where:

R is the Hall coefficient of the Hall plate in volt centimeters per ampere gauss
I is the input current in amperes
H is the magnetic field in gauss
*t* is the thickness in centimeters The extreme consequent fragility of such very thin Hall plates has heretofore precluded their use in practical devices. Germanium is a rather brittle metal and the slightest strain shatters such very thin plates. Moreover, such thin plates dissipate very little heat, and the temperature change normally accompanying their use considerably reduces their Hall effect characteristics.

Accordingly, an important object of the invention is to provide a rugged and sturdy Hall effect device which may employ a very thin Hall plate less than 0.010" thickness as the effective element thereof.

Another object is to provide a Hall effect device which is more rugged and sturdy than conventional Hall effect devices regardless of the thickness of the Hall plate incorporated therein.

Another object of the invention is to provide a Hall effect device which facilitates cooling of the Hall plate included therein.

A further object of the invention is to provide a Hall effect device that has a high output impedance, such as above 10,000 ohms.

A still further object of the invention is to provide a Hall effect device that has greater sensitivity than conventional devices due to a smaller thickness of the effective Hall plate as well as a smaller gap in the magnetic flux path.

The novel features which I believe characteristic of the invention are set forth in the appended claims. The invention itself, however, together with further objects and advantages thereof, can best be understood by the following description taken in connection with the accompanying drawing in which Fig. 1 is a perspective view of a Hall effect device embodying the invention, while Fig. 2 is a schematic diagram illustrating the use of a Hall effect device of Fig. 1 in conjunction with an electric circuit having high input impedance.

In general, a Hall effect device embodying the invention comprises a pair of ferromagnetic plates which support the Hall plate between them, but are separated from the Hall plate by a pair of electric insulating layers. A sandwichlike construction is thus produced in which the Hall plate is the central layer, insulating layers cover respective opposite major faces of the Hall plate and ferromagnetic plates cover the respective insulating layers. Input and output terminals are connected to mutually perpendicular edges of the Hall plate. The entire "sandwich" is secured together by suitable bonding material to form a sturdy "packaged" Hall effect device which may employ a very thin Hall plate without danger of breakage. The ferromagnetic plates enable greater heat dissipation from the Hall plate. In addition, the resulting Hall effect device may be supported by direct contact between the opposing magnet poles and the ferromagnetic plates of the device so that the only gap in the magneitc flux path is the thickness of the insulating layers.

Figure 2:
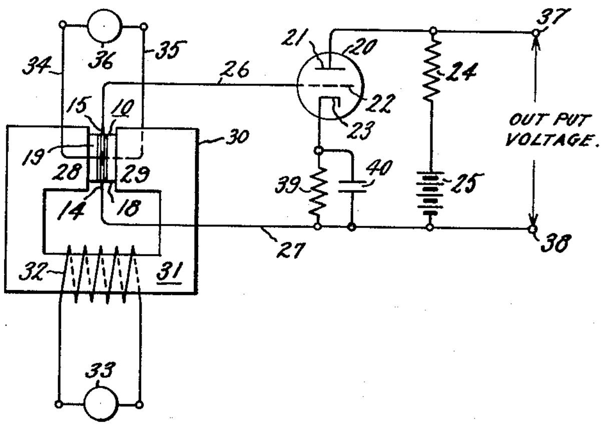

Referring to Fig. 1, I have shown my invention in one form as comprising a Hall effect device 10 including a Hall plate 11 preferably comprising primarily germanium having a resistivity above 10 ohm centimeters. For high impedance, Hall plate 11 should preferably have a thickness dimension no greater than 0.010"; a Hall plate having a thickness of the order of 0.005" or even 0.001" being suitable, depending upon the characteristics desired. Suitable input terminal conductors 12 and 13 and output terminal conductors 14 and 15 are respectively connected to the four edges of the plate 11 preferably in the central region of each edge, as shown. Conductors 12 through 15 are commonly known as the "Hall electrodes," and are preferably connected to opposite edges along mutually perpendicular diametric lines of plate 11. Electrodes 12 through 15 may conveniently comprise several layers of electrically conductive metal foil soldered to the respective edges of Hall plate 11.

A pair of insulating layers 16 and 17 are secured to and preferably completely cover respective opposite major faces of plate 11. Insulating layers 16 and 17 may comprise any well known electrically insulating dielectric sheet material and are preferably secured to plate 11 by any suitable non-conducting cementitious material, such as alkyd resin cement. A pair of plates 18 and 19 composed of a ferromagnetic material such as steel are similarly secured to and cover the layers 16 and 17 respectively. Insulating layers 16 and 17 need only be thick enough to prevent electric conduction between Hall plate 11 and ferromagnetic plates 18 and 19; a thickness of the order of 0.001" being sufficient for most known dielectric materials.

The length and width dimensions of Hall effect device 10 are co-extensive with those of the Hall plate 11, and are usually not very critical; a length of 2 centimeters and a width of 1 centimeter being typical. For greater strength of construction electrodes 12 through 15 may be extended a short distance within device 10 between the Hall plate 11 and an adjacent insulating layer 16 or 17, and the bonding of the layer 16 or 17 to the Hall plate 11 employed to hold the Hall electrodes therebetween.

Referring now to Fig. 2, I have diagrammatically illustrated how Hall device 10 may be employed to drive an electric circuit having high input impedance. An electron discharge device 20 having an anode 21, a control electrode 22, and a cathode 23 is connected in circuit with a load resistor 24 and a direct current source 25 to form a conventional amplifier stage. A cathode resistor 39 and by-pass capacitor 40 may be included to provide a proper bias voltage for discharge device 20. As is well known, electron discharge device 20 has high input impedance between the control electrode 22 and cathode 23. Control electrode 22 and cathode 23 are connected through suitable conductors 26 and 27 to respective output Hall electrodes 14 and 15 of device 10. Hall effect device 10 is supported between poles 28 and 29 of a core 30 of an electromagnet 31 with poles 28 and 29 preferably in direct supporting contact with ferromagnetic plates 18 and 19 respectively. Alternatively, Hall effect device 10 may be supported by auxiliary means rather than by contact with poles 28 and 29. In this latter case, a slight airgap may be left between the pole faces and the ferromagnetic plates 18 and 19. A coil 32 is wound on core 30 in order to enable the electromagnet to be energized from any suitable current source 33.

A pair of input conductors 34 and 35 are connected to deliver an input signal to input Hall electrodes 12 and 13 respectively from another current source 36. The output voltage produced from the amplification stage associated with discharge device 20 is developed across load resistor 24 and delivered to a suitable indicating device or other load circuit through output terminals 37 and 38.

In operation, a current supplied through coil 32 from current source 33 induces a proportional magnetic flux in core 30 and through Hall device 10. If the Hall device 10 is directly supported in contact with poles 28 and 29 with no air gap therebetween, the only non-magnetic material in the flux path of electromagnet 31 is the insulating layers 16 and 17. Consequently, there is an unusually high concentration of magnetic flux through Hall plate 11 even when relatively small currents are supplied to coil 32. This higher intensity magnetic field, of course, increases the magnitude of output voltage produced by the Hall plate 11.

When a current is passed through Hall plate 11 as a result of a connection of input Hall electrodes 12 and 13 across a source 36, there is a well-known "Hall effect" interaction between the resulting current flow through Hall plate 11 and the magnetic field traversing the thickness of plate 11 as a result of the energization of electromagnet 31. A potential difference is generated between output Hall electrodes 14 and 15 whose magnitude is proportional to the intensity of the magnetic field and the amplitude of the current flowing through plate 11 between input electrodes 12 and 13. If one of the current sources such as source 33 or source 36 is maintained constant, the output voltage produced between electrodes 14 and 15 varies in accordance with the other current source. If both current sources 33 and 36 are varied simultaneously, then the interaction of the varying magnetic field and the varying longitudinal current through Hall plate 11 produces a voltage between output Hall electrodes 14 and 15 whose instantaneous magnitude is proportional to the instantaneous product of the two current sources. The output Hall voltage developed between electrodes 14 and 15 may be applied directly as the control voltage between the control electrode 22 and cathode 23 of the electron discharge device 20, and the conduction of discharge device controlled accordingly. The high output impedance of the very thin Hall plate 11 produces no appreciable load upon the input circuit of the discharge device 20, and no impedance-matching transformers or other devices are thus required between the output of the Hall device 10 and the input of discharge device 20.

Although the principal advantages of my invention accrue with very thin Hall plates having a thickness ranging, for example, from 0.001" to 0.010", it will be appreciated that the construction of the invention may likewise be employed with Hall plates having conventional greater thickness. The advantages of greater sturdiness of construction and greater heat-dissipating properties will be present even with such conventional greater thickness Hall plates.

Although I have described above a particular embodiment of my invention, many modifications may be made. It is to be understood that I intend to cover by the appended claims all such modifications as fall within the true spirit and scope of the invention.

What I claim as new and desire to secure by Letters Patent of the United States is:

1. A Hall effect device comprising a single Hall plate having flat opposing major faces and a thickness less than 0.010 inch, two layers of electric insulation each secured to and covering a respective major face of said Hall plate, and two ferromagnetic plates each secured to and covering a respective insulation layer.

2. A Hall effect device comprising a single Hall plate having flat opposing major faces and a thickness less than 0.010 inch, a pair of ferromagnetic plates each located adjacent an opposite face of said Hall plate, and two layers of insulation, each layer being located between a respective ferromagnetic plate and said Hall plate, said ferromagnetic plates being secured to said Hall plate by said insulation layers.

3. A Hall effect device comprising a pair of ferromagnetic plates and a single Hall plate less than 0.010 inch thick arranged in co-planar alignment and with said Hall plate intermediate said ferromagnetic plates, and a pair of insulating sheets each separating said Hall plate from one of said ferromagnetic plates, said Hall plate and said ferromagnetic plates being secured to said insulating sheets to form an integrated self-contained unit.

4. The Hall effect device of claim 2 in which the Hall plate has a thickness of the order of 0.005 inch and comprises primarily germanium having a resistivity above 10 ohm centimeters.

5. The Hall effect device of claim 2 in which the Hall plate has a thickness of the order of 0.001 inch and comprises primarily germanium having a resistivity of above 10 ohm centimeters.

6. A Hall effect device comprising a single Hall plate having a thickness less than 0.010 inch and an output impedance above 10,000 ohms, and ferromagnetic means for supporting and covering said Hall plate including electric insulating layers for insulating said Hall plate from said ferromagnetic supporting means.

7. A Hall effect device comprising a single rectangular Hall plate less than 0.010 inch thick and a pair of ferromagnetic plates having corresponding length and width dimensions arranged in coplanar alignment and with said Hall plate intermediate said ferromagnetic plates, and a pair of electric insulating sheets approximately 0.001 inch thick separating said Hall plate from said ferromagnetic plates; said Hall plate, said ferromagnetic plates and said insulating sheets being bonded together.

8. The Hall effect device of claim 7 in which the rectangular Hall plate comprises primarily germanium and has a pair of input Hall electrodes secured to the central region of one pair of opposite parallel edges of said plate and has a pair of output Hall electrodes secured to the central region of the other parallel edges of said Hall plate.

9. In combination, a single Hall effect device comprising a Hall plate having flat opposing major faces and a thickness less than 0.010 inch, two layers of electric insulation approximately 0.001 inch thick each secured to and covering a respective major face of said Hall plate, and two ferromagnetic plates each secured to and covering a respective insulation layer, and a magnet supporting said Hall effect device between the magnetic poles thereof with said ferromagnetic plates in direct contact with said poles.

References Cited in the file of this patent

UNITED STATES PATENTS

| | | |
|---|---|---|
| 1,825,855 | Craig | Oct. 6, 1931 |
| 2,154,260 | Branderburger | Apr. 11, 1939 |
| 2,333,446 | Rogers | Nov. 2, 1943 |
| 2,464,807 | Hansen | Mar. 22, 1949 |
| 2,543,640 | Millar et al. | Feb. 27, 1951 |
| 2,551,265 | Hansen | May 1, 1951 |
| 2,649,574 | Mason | Aug. 18, 1953 |

OTHER REFERENCES

Russell: Shop Note, pages 1028–1029, Review of Scientific Instruments, vol. 21, No. 12, December 1950.